US009805177B1

(12) United States Patent
Chakravarthy et al.

(10) Patent No.: US 9,805,177 B1
(45) Date of Patent: Oct. 31, 2017

(54) PROCESSING LARGE DATA SETS FROM HETEROGENEOUS DATA SOURCES USING FEDERATED COMPUTING RESOURCES

(71) Applicant: Amazon Technologies, Inc., Seattle, WA (US)

(72) Inventors: Diwakar Chakravarthy, Kirkland, WA (US); Justin Canfield Crites, Seattle, WA (US); Sainath Chowdary Mallidi, Seattle, WA (US); Charles Porter Schermerhorn, Seattle, WA (US); Patrick Jing Ye, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 14/867,578

(22) Filed: Sep. 28, 2015

(51) Int. Cl.
*G06F 21/31* (2013.01)
*G06F 21/62* (2013.01)
*G06F 17/30* (2006.01)

(52) U.S. Cl.
CPC ........ *G06F 21/31* (2013.01); *G06F 17/30566* (2013.01); *G06F 17/30867* (2013.01); *G06F 21/6227* (2013.01); *G06F 2221/2129* (2013.01)

(58) Field of Classification Search
CPC .............. G06F 21/31; G06F 17/30566; G06F 17/30867; G06F 21/6227; G06F 2221/2129
See application file for complete search history.

(56) References Cited

U.S. PATENT DOCUMENTS

| | | | | |
|---|---|---|---|---|
| 9,344,371 | B1* | 5/2016 | Sanyal | .................... H04L 67/22 |
| 2016/0125026 | A1* | 5/2016 | Nguyen | ............ G06F 17/30395 |
| | | | | 707/713 |
| 2016/0239230 | A1* | 8/2016 | Sato | .......................... G06F 3/06 |
| 2017/0039284 | A1* | 2/2017 | Nichols | ............... H04L 67/1097 |

* cited by examiner

*Primary Examiner* — Amir Mehrmanesh
(74) *Attorney, Agent, or Firm* — Thomas | Horstemeyer, LLP

(57) ABSTRACT

Disclosed are various embodiments of systems, methods, and computer programs that can facilitate processing of large data sets from data sources. Examples of the disclosure can allow a client to perform data processing tasks in computing resources that are external to a data source from which the data is retrieved rather than relying upon the computing resources of the data source.

18 Claims, 5 Drawing Sheets

PROCESSING LARGE DATA SETS FROM HETEROGENEOUS DATA SOURCES USING FEDERATED COMPUTING RESOURCES

BACKGROUND

In various settings, data processing tasks involving large data sets can be required in various use cases. For example, email targeting campaigns can require processing data sets involving various tables of data about users from various data sources as well as performing database queries on these data sets to identify users to whom targeted emails will be sent. In this scenario, data might be needed from different data stores and from various data tables within the different data stores. Additionally, for a large scale email targeting campaign, data store queries involving billions and billions of data entries might be required in order to identify the targets of such a campaign. These operations can tax the computing resources of the data stores from which the data is being retrieved, which can hamper the performance of the data stores with respect to other operations that the data stores might be tasked to perform.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Embodiments of the present disclosure relate to performing data processing tasks based upon data obtained from one or more data sources. Data can be obtained from data sources that are external to a computing environment in which a query engine is executed and a query script or any other executable code is interpreted. For example, a computing environment tasked by a client or user with generating an email targeting campaign may require data from various data sources that are external to the computing environment. In some scenarios, these data sources may be operated and maintained by other users, teams, or entities. For example, in a large enterprise, a marketing team can be tasked with running an email marketing campaign based upon data that is housed in a data source that is maintained by an operations team. In such a scenario, the team or entity that is charged with maintaining the data source can prioritize the needs of external users lower than its own users. However, external users may require very large data sets that are generated using resource intensive queries or other data operations from the data source.

In some scenarios, a user, team, or entity charged with maintaining a data source, in order to prioritize its own uses and the uptime of the data source above the needs of external users, may limit the access of external users to the resources of the data source. In other scenarios, a data processing task can involve the retrieval of data from multiple data sources that are heterogeneous in nature. For example, in order to identify recipient users of an email marketing campaign, a client may require data from more than one data source. In one example, an email marketing campaign can take the form of emails that are sent to users who have viewed or purchased a particular item from a catalog. In this example, in order to identify users to whom the email marketing campaign will apply, one or more query can be executed by the data source in which data is housed regarding users who have viewed or purchased a particular item.

In a data source in which information about millions of users are housed, such a query (or queries) can consume considerable resources or considerable time. In some scenarios, an owner of the data source may restrict the ability of other users or clients to perform data processing operations that consume significant amounts of time or computing resources of the data source. Accordingly, embodiments of this disclosure facilitate performing data processing operations on potentially large data sets that can relieve much of the data processing burden from the data source from which the data sets are obtained.

Figure 1:
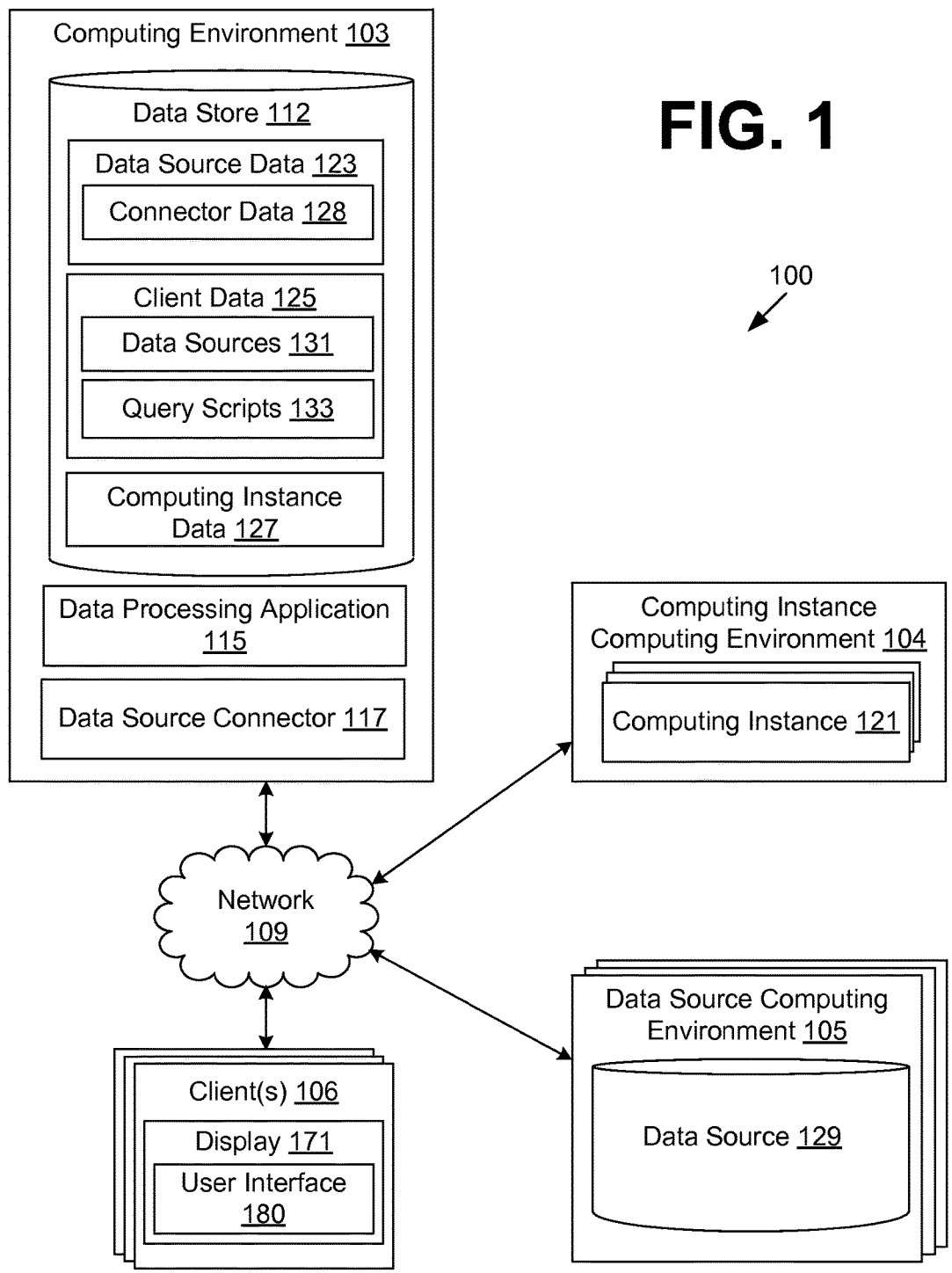
FIG. 1 is a drawing of a networked environment according to an embodiment of the present disclosure.

With reference to FIG. 1, shown is a networked environment 100 according to various embodiments. The networked environment 100 includes a computing environment 103, at least one computing instance computing environment 104, at least one data source computing environment 105, and a client 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 or computing instance environment 104 may comprise, for example, a server computer or any other system providing computing capability. Alternatively, the computing environment 103, 104 may employ a plurality of computing devices that may be arranged, for example, in one or more server banks or computer banks or other arrangements. Such computing devices may be located in a single installation or may be distributed among many different geographical locations. For example, the computing environment 103, 104 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

In one embodiment, the computing environment 103, 104 can comprise many computing devices or servers in which virtualized computing instances can be created. The virtualized computing instances correspond to virtual machines or computing resources that can perform data processing operations or any other operations that a computing device can perform. For example, a computing instance of a certain memory allocation, central processing unit (CPU) allocation, operating system, mass storage allocation, or other properties, can be created within the computing environment 103, 104.

Various applications and/or other functionality can be executed in the computing environment 103 according to various embodiments. Also, various data is stored in a data store 112 that is accessible to the computing environment 103. The data store 112 may be representative of a plurality of data stores 112 as can be appreciated. The data stored in the data store 112 for example, is associated with the operation applications and/or computing instances executed by the computing environment 103.

The components executed on the computing environment 103, for example, include the data processing application 115 and the data source connector 117. The data processing application 115 is executed to perform data processing operations on data obtained from data sources that are external to the computing environment 103. In one example, the data processing application 115 can implement a query engine that can interpret scripts that are written in a query language. Examples of query languages that the data processing application 115 can interpret are structured query language (SQL) scripts, Hive scripts, or other fragments and scripts that are authored in other query languages.

The data processing application 115 can interpret query languages because a client or user manipulating or creating large data sets that are taken from relational or non-relational databases or data stores will often author a script in a query language to manipulate source data and generate a resultant data set in a format that can be used for a particular application. Returning again the example of an email targeting campaign in which certain users from a large population of users are identified as recipients of a marketing campaign, the initiator of such a campaign may wish to identify a subset of users from potentially millions of users and query against data that is stored about these users in multiple data sources. Additionally, generating an email targeting campaign can also involve identifying one or more products from a product catalog that can be recommended to users who are identified as a part of the targeting campaign. Oftentimes, the most efficient way to express the logic necessary to gather and sort data in this way is using a query language.

The data processing application 115 can interpret query language requests or commands that potentially involve large data sets and/or multiple data sources and act as an orchestrator for execution of the script. In other words, the data processing application 115 or computing instances 121 allocated in the computing instance computing environment 104 can interpret queries that query against external data sources and deconstruct the query into a command that requests data stored in the data source while executing data processing operations expressed by the query in computing resources that are external to the data source. For example, in the case of a data source that is a relational database, such as an ORACLE database, the data processing application 115 or a computing instance 121 can avoid requesting that the relational database perform a JOIN operation. Instead, the data processing application 115 or a computing instance 121 can individually request the tables between which the script is joining and perform the JOIN in computing resources allocated within the computing instance computing environment 104 that are external to the data source.

In this way, the data source 129 need not perform the JOIN on behalf of the data processing application 115 or computing instance 121 even though the query language script, when interpreted by other query engines, may have requested that the data source perform the JOIN and return the resultant data set. In this way, the computing resources of the external data source can avoid being taxed and the data processing application 115 can also allocate computing resources above and beyond those that are available to the data source, which can offer improved performance in some cases. Additionally, for queries that include other data processing tasks other than the mere retrieval of data, the data processing application 115 or computing instance 121 can request the source data from the data sources identified by the query and perform the data processing tasks in computing resources external to the data source.

The data source connector 117 can provide accessibility to external data sources to the data processing application 115 or computing instance 121. The data source connector 117 can interpret metadata associated with various types of external data sources that specifies how a particular data source should be accessed. For example, a particular data source can provide an application programming interface (API) that specifies how data stored in the data source can be accessed. The API can also specify which data retrieval or data processing tasks are supported by the data source.

The computing instance computing environment 104 can represent a computing environment in which a user can create or allocate computing resources that can handle data processing tasks as directed by the data processing application 115. In this sense, computing instances 121 that can be allocated or created within the computing environment. The computing environment 104 can comprise many computing devices or servers in which computing instances 121 can be created. Computing instances 121 correspond to virtual machines that can be spawned or created on one or more computing devices from which the computing environment 103 is devised. The computing instances 121 correspond to virtual machines or computing resources that can perform data processing operations or any other operations that a computing device can perform. For example, a computing instance 121 of a certain memory allocation, central processing unit (CPU) allocation, operating system, mass storage allocation, or other properties, can be created within the computing environment 103.

In some scenarios, the data processing application 115 can be executed by a computing instance within the computing environment 103. Additionally, data processing operations can be performed using computing instances 121 created within the computing environment 104. In this way, a client can provide its own computing instances within the computing instance computing environment 104 rather than relying upon the computing resources of the data source 129 or the computing environment 103 to produce resultant data sets based upon a query script 133 or any other executable script or code.

The data source computing environment 105 corresponds to one or more computing devices associated with a data source from which data can be retrieved by the data processing application 115 to perform data transformation or data processing operations. The data source computing environment 105 can correspond, for example, to a database cluster, or any other type of data store or data warehouse from which data can be retrieved by the data processing application 115. The data source computing environment 105 can execute one or more applications or services that provide an application programming interface (API) or other type of interface through data stored in the data source 129 can be retrieved. In one embodiment, the data source computing environment 105 is external to the computing environment 103. In one scenario, the data source computing environment 105 can be operated by users or entities that are different from the users or entities associated with the computing environment 103.

The data source computing environment 105 may comprise, for example, a server computer or any other system providing computing capability. Alternatively, the data source computing environment 105 can employ a plurality of computing devices that may be arranged, for example, in one or more server banks or computer banks or other arrangements. Such computing devices may be located in a single installation or may be distributed among many different geographical locations. For example, the data source computing environment 105 may include a plurality of computing devices that together may comprise a hosted computing resource, a grid computing resource and/or any other distributed computing arrangement. In some cases, the data source computing environment 105 may correspond to an elastic computing resource where the allotted capacity of processing, network, storage, or other computing-related resources may vary over time.

The data source computing environment 105 can house a data source 129. The data source 129 corresponds to one or more data stores in which data can be stored. The data can correspond to customer data, transaction data, user data, or any other data that can be retrieved using a query language script or query language command. Additionally, the networked environment 100 can include multiple data source computing environments 105. In one scenario, a query can reference different data sources 129 that are located in different data source computing environments 105. The query can also specify a data processing operation that can be performed with respect to data referenced by the query to generate a resultant data set.

The data stored in the data store 112 includes, for example, data source data 123, filter data 229, a transaction history 231, and user data 233. The data source data 123 corresponds to data that identifies data sources 129 or data source computing environments 105 that are accessible by the data processing application 115. In one scenario, a data source 129 can be registered with the data processing application 115 by providing metadata specifying how data housed in the data source 129 can be accessed by the data processing application 115. In one example, the metadata can specify a particular API that is supported by the data source 129 or the data source computing environment 105 or a network address at which the data source 129 can be accessed. Connector data 128 can store the metadata that specifies how a particular data source 129 or data source computing environment 105 can be accessed. In some embodiments, the data source 129 or the data source computing environment 105 can implement a connector that supports a query language with which the data processing application 115 can retrieve data from the data source 129.

In some scenarios, a particular data source 129 or data source computing environment 105 may require authenticated access in order to retrieve data from the data source 129. Accordingly, the connector data 128 can also specify how an authenticated request to the data source 129 or data source computing environment 105 should be conducted. For example, the connector data 128 can specify that an access policy should be created that grants access to the data source 129 on behalf of a particular client or user account within the data source computing environment 105.

Client data 125 represents data about clients, or users, of the data processing application 115. The data processing application 115 can support data processing operations based upon data retrieved from various data source computing environments 105 for multiple users. Accordingly, the client data 125 can house data corresponding to user accounts of multiple users of the data processing application 115 who can employ the data processing application 115 for different data processing tasks. The client data 125 can include information regarding data sources 131 to which a particular client or user account has access. Query scripts 133 can store query language scripts that define data processing tasks for execution by the data processing application 115. In one example, a query script 133 can include a Hive script, a SQL script, or any other type of code, markup language, or scripting language that can be executed by the data processing application 115 to generate a resultant data set. A query script 133 can also include code that is executable by computing environment 103.

Computing instance data 127 represents data that corresponds to computing instances 121 that are created within the computing instance computing environment 103. The computing instance data 127 identifies computing instances 121 that have been created within the computing instance computing environment 103 as well as the data processing tasks or query scripts 133 to which a particular computing instance 121 is assigned. The computing instance data 127 can also specify an operating system, CPU, memory, or other properties of a particular computing instance 121 created within the computing instance computing environment 104.

The client 106 is representative of a plurality of client devices that may be coupled to the network 109. The client 109 can represent a computing device used by a user initiating a data processing task that is handled by the data processing application 115. The client 106 can include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 171. The display 171 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 106 may be configured to execute various applications such as a browser 274 and/or other applications. The browser 274 may be executed in a client 106, for example, to access network content served up by the computing environment 103 and/or other servers, thereby rendering a user interface 150 on the display 171. In particular, the user interface 150 can be generated by the data processing application 115 or other applications executed in the computing environment 103 and rendered by the client 106. A user can configure the data processing application 115 or initiate a data processing task within the data processing application 115 via the client 106.

Next, a general description of the operation of the various components of the networked environment 100 is provided. The data processing application 115 is executed to facilitate the processing of potentially large data sets that can be obtained from potentially multiple data sources 129. One example of such a task is constructing a resultant data set from multiple data sets in various data sources 129. A data processing task can take the form of one or more queries in a query language in a query script 133 that are interpreted by the data processing application 115.

The data processing application 115 can interpret a query in a query script 133 and execute various queries such that data processing tasks, such as, for example, JOIN operations or other processing intensive operations, are performed in one or more computing instances 121 created by the data processing application 115 rather than by the data source computing environment 105. Accordingly, in order to execute a query script 133, the data processing application 115 or a user can create a computing instance 121 that can be assigned to execution of the query script 133. The query script 133 can define one or more queries or other operations that direct the data processing application 115 to obtain data from one or more data sources 129 and generate a resultant data set, such as a list of the identity of multiple users who are the target of an email marketing campaign.

The data processing application 115 can interpret a query script 133 and execute the queries and other commands within the query script 133 in order to generate a resultant data set. In some examples, the data processing application 115 can allocate a computing instance 121 and assign execution of the query script 133 to the computing instance 121. In other examples, upon reaching a query in a query script 133 that incorporates a request for data from a data source 129, the data processing application 115 can create a computing instance 121 assigned to execution of the query script 133. In either scenario, the computing instance 121 can retrieve the data from the data source 129 (and potentially multiple data sources 129) and load the data into the computing instance 121. The allocated computing instance 121 can also transform the data according to a data processing task contained within the query script 133 in order to generate resultant data. In some examples, the data processing task 115 can allocate multiple computing instances 121 to a data processing task depending upon the size of the data set that is associated with a task specified by a query script 133.

Additionally, the data processing application 115 can allocate more computing instances 121 to execution of a query script 133 depending upon how quickly a particular task needs to be completed. For example, if a task requires processing of a particularly large data set or particularly fast execution, the data processing application 115 can execute more than one computing instance 121 to a data processing task or allocate a computing instance 121 with additional virtual computing resources, such a virtual CPUs, RAM, mass storage, etc.

In some embodiments, the data processing application 115 or a computing instance 121 generated by the data processing application 115, upon reaching a query that incorporates a data processing task with respect to data stored in a data source 129, can generate a command supported by the data source 129 to retrieve the data according to the connector data 128. The data processing application 115 can then invoke the data source connector 117 to retrieve the data identified by the query. The data can be identified by a table name, a field name, and/or any other identifier by which the data can be identified within the data source 129.

Accordingly, the data processing application 115 can initiate loading of the data retrieved from the one or more data sources 129 into the computing instance 121 assigned to execution of the query script 133. The data processing application 115 or computing instance 121 can then perform a data processing task specified by the query. For example, the data retrieved from one or more data sources 129 may include various data tables that correspond to data that is of interest. The data processing task specified by the query can include a JOIN operation that generates a resultant data set. The data processing application 115 can execute the JOIN operation using a computing instance 121 that is external to the data source 129 or data source computing environment 105. In this way, the data processing application 115 can facilitate processing of a large data set without necessarily taxing the resources of the data sources 129 or data source computing environments 105 from which the data was obtained.

In some scenarios, the data source 129 required by a particular query in a query script 133 may require authenticated access on behalf of a client or user for whom the query script 133 is executed within the data processing application 115 or computing instance 121. In this scenario, a query script 133 interpreted by the data processing application 115 or computing instance 121 can facilitate generating an access policy authorizing access to the data source on behalf of a particular user or client. In this scenario, the access policy provides federated access to the data source on behalf of the client or user. In this way, the client or user initiating execution of the query script 133 provides an authentication credential for access to the data source 129.

In another scenario, the query script 133 can include one or more commands that generate or retrieve an authentication token with which the data processing application 115 or computing instance 121 can access a data source 129. The data processing application 115 or computing instance 121 can be configured to discard such an authentication token upon accessing the data source. In some examples, the authentication token can expire after a predetermined period of time.

In some scenarios, access to the data source 129 may be impaired due to downtime of the data source 129 and/or network conditions. Accordingly, in this scenario, the data processing application 115 can retry attempts to access data corresponding to the query. In this way, a client or user initiating execution of the query script 133 need not be aware of the status of the data source 129, as the data processing application 115 handles failed operations resulting from execution of a query script 133 on behalf of the user or client.

Upon loading of the data from one or more data source 129, the data processing application 115 or computing instance 121 can then perform a data processing task or data transformation operation embodied in a particular query or query script 133. The data processing application 115 or computing instance 121 can generate a resultant data set, which can comprise a table of data that is of interest to a user or client initiating execution of the query script 133. The resultant data set can be used for any purpose and is generated without taxing the sources of the data source 129 or data source computing environment 105. In other words, the data processing application 115 can facilitate execution of the query in the computing instance 121 instead of using the computing resources of the data source 129 or the data source computing environment 105.

Figure 2:
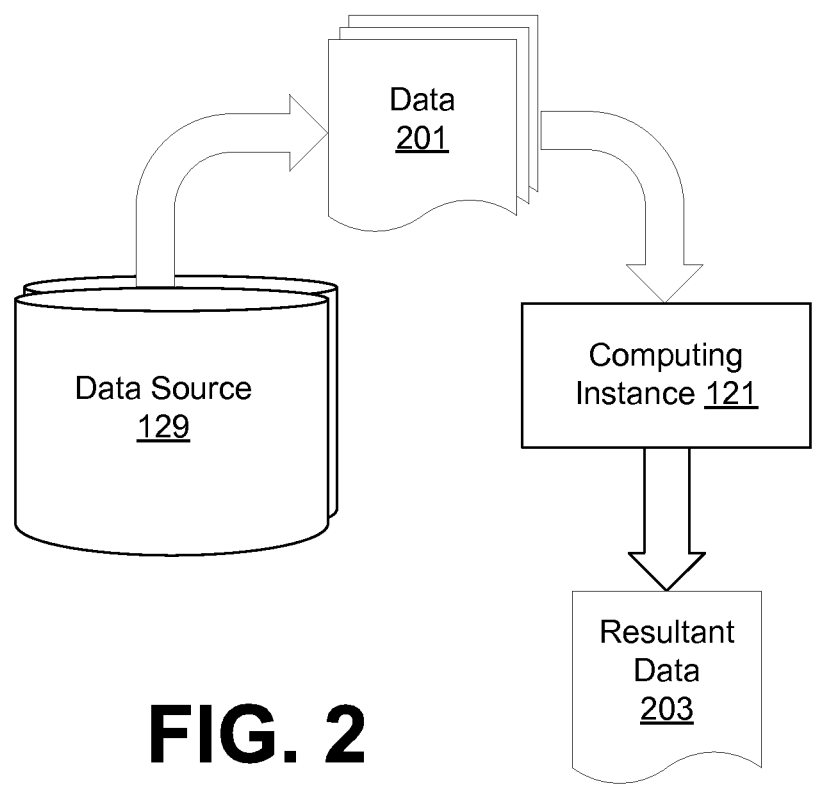
FIG. 2 is a drawing of an example according to an embodiment of the present disclosure.

Referring now to FIG. 2, shown is a depiction of a data processing pipeline facilitated by the data processing application 115 according to various embodiments of the disclosure. FIG. 2 illustrates how the data processing application 115, in response to a query in a query script 133 that contains a data processing task that is based upon data stored in one or more data sources 129, can facilitating loading the data from the data sources 129 into a data processing pipeline.

As depicted in FIG. 2, data 201 can be retrieved or extracted from one or more data sources 129 by the data processing application 115 or a computing instance 121 in the computing instance computing environment 104. The data 201 retrieved from the data sources 129 is associated with a query interpreted by a query engine implemented by the data processing application 115. The data processing application 115 can identify a data processing task associated with the query and transmit a command to retrieve the data 201 from the data sources 129. In some embodiments, the data processing application 115 can identify metadata from the data source data 123 or client data 125 that identifies how data from the data source 129 can be retrieved. The data processing application 115 can generate a computing instance 121 within the computing instance computing environment 104 and provide the metadata to the computing instance 121. In one embodiment, the data processing application 115 can direct the computing instance 121 to retrieve the data from the data source 129.

Upon receiving the data 201 from the data sources 129, the data 201 can be loaded into a computing instance 121 assigned to execution of the data processing application 115. In one embodiment, the data processing application 115 can create a computing instance 121 and direct the computing instance 121 to transmit a command to retrieve the data 201 from the data source 129. In this way, the data processing application 115 can facilitate execution of a query in the computing instance 121 instead of using the resources of the data source 129 or a data source computing environment 105 from which the data 201 is obtained. Utilizing the resources of the computing instance 121 can also offer improved performance with respect to creation resultant data 203 based upon the query in a query script 133.

Figure 3:
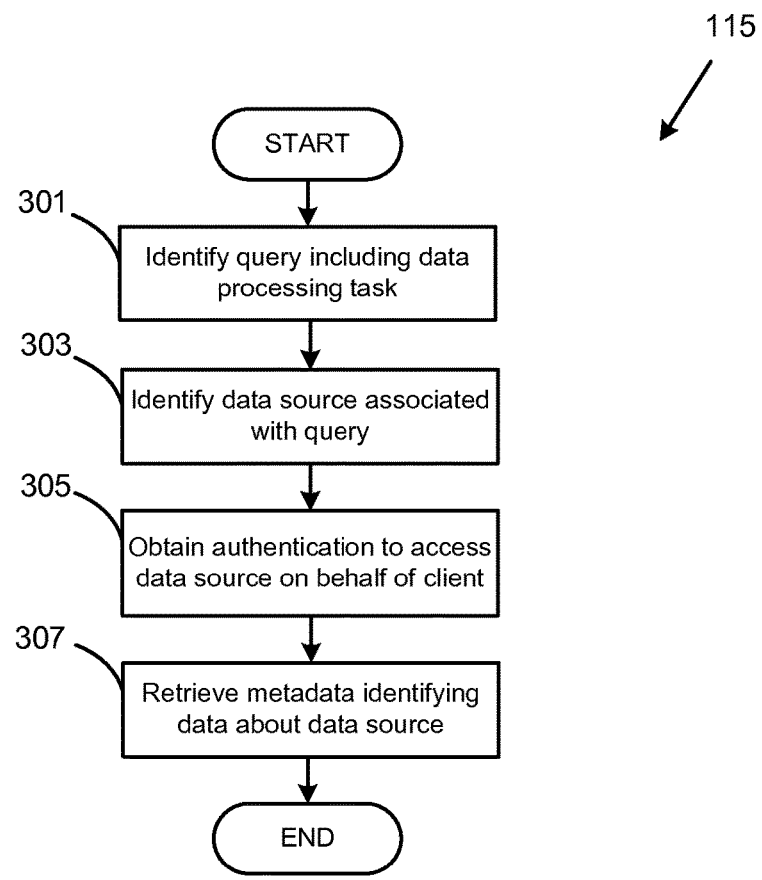
FIGS. 3-4 are flowcharts that provide examples according to an embodiment of the present disclosure.

With reference to FIG. 3, shown is a flowchart that provides one example of the execution of the data processing application 115. Alternatively, FIG. 3 shows steps of a method implemented in the computing environment 103. FIG. 3 illustrates an example of the data processing application 115 retrieving data from a data source 129. Accordingly, at box 301, the data processing application 115 can identify a query that includes a data processing task in a query script 133. As noted above, the query can reference data from data sources 129 that are external to the computing environment 103 in which the data processing application 115 is executed.

At box 303, the data processing application 115 can identify a data source 129 associated with the query. In other words, the data processing application 115 can determine that the query reference data that is stored in an external data source 129. At box 305, the data processing application 115 can obtain authenticated access to the data source 129 on behalf of a client 106 or user initiating execution of the query script 133. Authenticated access can be obtained by obtaining an authentication token or federated access to the data source 129 on behalf of the user or client 106. In some embodiments, authenticate access can be obtained for a computing instance 121 created by the data processing application 115 that is created to perform a data processing task represented in a query from the query script 133. At box 307, the data processing application 115 can retrieve metadata specifying how data can be retrieved from the data source 129 by a computing instance 121 in the computing instance computing environment 104.

Figure 4:
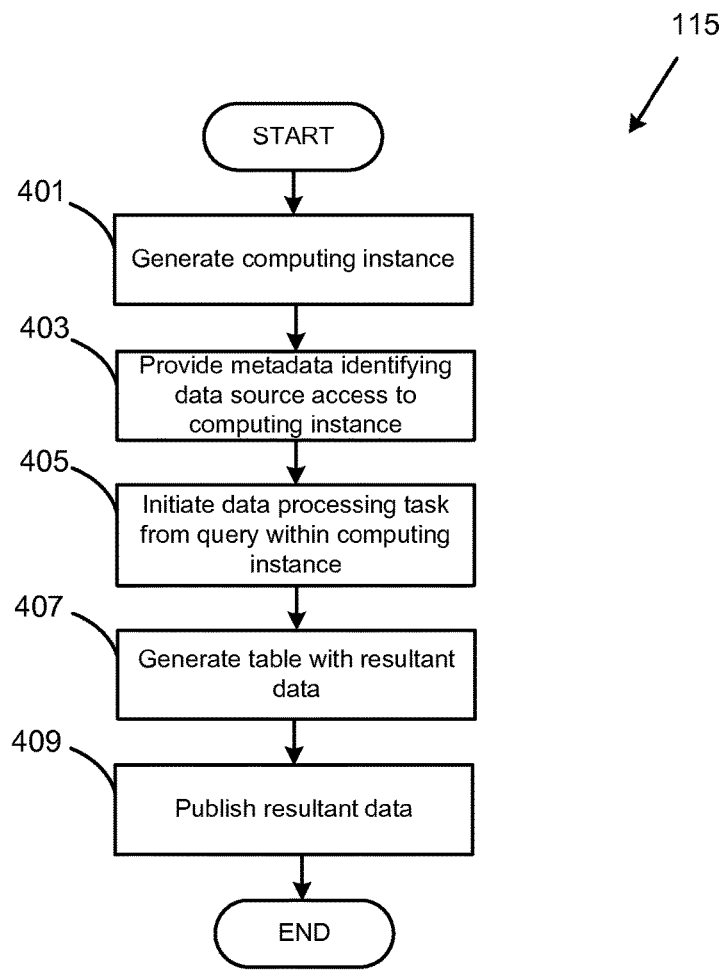

With reference to FIG. 4, shown is a flowchart that provides one example of the execution of the data processing application 115. Alternatively, FIG. 4 shows steps of a method implemented in the computing environment 103. FIG. 4 illustrates an example of the data processing application 115 facilitating the creation of a resultant data set from data obtained from one or more data sources 129. Accordingly, at box 401, the data processing application 115 can generate a computing instance 121 in which a data processing task corresponding to a query can be executed. At box 403, the data processing application 115 can provide metadata specifying on data can be obtained by the computing instance 121 from the one or more data sources 129. In one example, the data can be loaded into a mass storage resource allocated to the computing instance 121 or a memory resource of the computing instance 121.

At box 405, the data processing application 115 can initiate execution of the data processing task specified by a query in the computing instance 121. At box 407, the data processing application 115 can create a resultant data set based upon the data and the data processing task. The resultant data set can comprise a table with data resulting from the query or the query script 133. At box 409, the data processing application 115 or computing instance 121 created by the data processing application 115 can publish the resultant data generated by the computing instance 121. Publishing the resultant data can take many forms. In one embodiment, publishing the resultant data can take the form saving the resultant data back to the data source 129. In another embodiment, publishing the resultant data can include transmitting a resultant data set to a client device 106. In yet another embodiment, publishing the resultant data can include publishing a resultant data set to another data source 129 that is different from the data source 129 from which the initial data was obtained.

Figure 5:
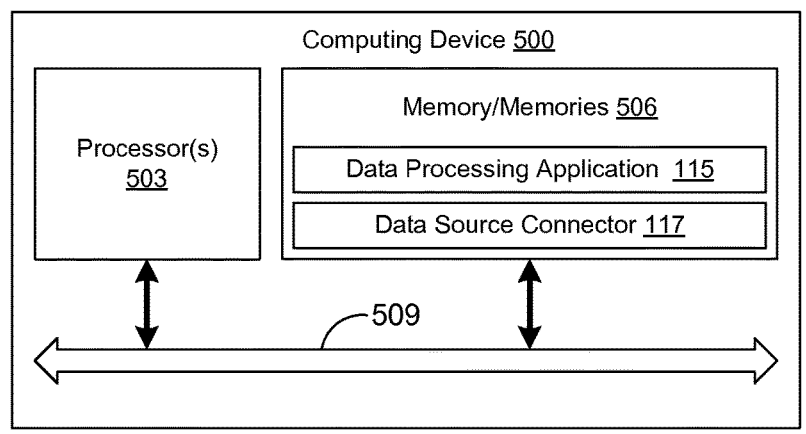
FIG. 5 is a block diagram of one example embodiment of a computing environment according to an embodiment of the present disclosure.

With reference to FIG. 5, shown is a schematic block diagram of the computing environment 103 according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the data processing application 115, data source connector 117, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the data processing application 115, data source connector 117, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-4 show the functionality and operation of an implementation of portions of the data processing application 115 and data source connector 117. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3-4 show a specific order of execution, it is understood that the order of execution may differ from that which is depicted. For example, the order of execution of two or more blocks may be scrambled relative to the order shown. Also, two or more blocks shown in succession in FIGS. 3-4 may be executed concurrently or with partial concurrence. Further, in some embodiments, one or more of the blocks shown in FIGS. 3-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data processing application 115 and data source connector 117, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the data processing application 115 and data source connector 117, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing environment 103 or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, having thus described the invention, at least the following is claimed:

1. A method comprising:
   obtaining a registration of a data source, the registration of the data source comprising metadata specifying how to access the data source;
   obtaining a request to generate resultant data based upon data stored in the data source, the request comprising a query into the data source and identifying a data processing task associated with the data;
   generating a command to access the data source on behalf of a client;
   interpreting the query associated with the request, wherein the query comprises the data processing task;
   identifying a data set from the data source associated with the query;
   transmitting a request to retrieve the data set from the data source instead of the query;
   retrieving data from the data source based at least in part upon the command;
   allocating at least one computing instance in a computing environment external to the data source for the data processing task associated with the data;
   executing the data processing task using the at least one computing instance in the computing environment external to the data source, wherein the query is executed using the at least one computing instance in the computing environment external to the data source instead of using the data source; and
   generating the resultant data based at least in part upon the data processing task and the data.

2. The method of claim 1, wherein the metadata specifies information about an application programming interface (API) through which the data source can be accessed, the information about the API comprising at least one API call or a network address associated with the data source.

3. The method of claim 1, further comprising reattempting retrieval of the data from the data source in response to an initial failure of retrieving the data from the data source.

4. The method of claim 1, further comprising loading the data from a data store into a data processing pipeline provided by the at least one computing instance in the computing environment.

5. The method of claim 1, wherein the data processing task comprises at least one query supported by the data source, wherein the query is executed by the at least one computing instance in the computing environment instead of by the data source.

6. The method of claim 1, wherein the data processing task is extracted from the request.

7. The method of claim 1, wherein generating the resultant data based at least in part upon the data processing task and the data further comprises generating a table based upon the query and the data from the data source.

8. The method of claim 1, further comprising generating an access policy authorizing access to the data source on behalf of the client, wherein the access policy provides federated access to the data source on behalf of the client.

9. The method of claim 1, wherein the command includes an authentication token providing access to the data source on behalf of the client, wherein the authentication token expires after a predetermined time period.

10. A system comprising:
    at least one computing device; and
    a data processing application executable by the at least one computing device, the data processing application, when executed, configured to cause the at least one computing device to at least:
       generate a computing instance in the at least one computing device, the computing instance comprising a virtual machine instance;
       identify a query comprising a data processing task on data stored in a plurality of data sources;
       interpret the query;
       identify a data set from the data sources associated with the query;
       transmit a request to retrieve the data set from the data sources instead of the query;
       generate a respective command to retrieve the data from each of the plurality of data sources;
       initiate loading of the data from each of the plurality of data sources into the computing instance; and
       execute the data processing task in the computing instance, wherein the query is executed using the at least one computing instance in the computing instance external to the data source instead of using the data sources.

11. The system of claim 10, wherein the plurality of data sources are external to the at least one computing device.

12. The system of claim 10, wherein the data processing application is further configured to cause the computing instance to generate a table based upon the query and the data set from the data source.

13. The system of claim 12, wherein the data processing application is further configured to cause the computing instance to publish the table.

14. The system of claim 10, wherein the data processing application is further configured to cause the at least one computing device to at least generate an access policy authorizing access to the plurality of data sources on behalf of a client, wherein the access policy provides federated access to the plurality of data sources on behalf of the client.

15. A non-transitory computer-readable medium embodying a program executable on at least one computing device, the program, when executed, causing the at least one computing device to at least:
    generate a computing instance in the at least one computing device, the computing instance comprising a virtual machine instance;
    identify a query comprising a data processing task on data stored in a plurality of data sources;
    interpret the query;
    identify a data set from the data sources associated with the query;
    transmit a request to retrieve the data set from the data sources instead of the query;
    generate a respective command to retrieve the data from each of the plurality of data sources;
    initiate loading of the data from each of the plurality of data sources into the computing instance; and execute the data processing task in the computing instance, wherein executing the query using the at least one computing instance in the computing instance external to the data source instead of using the data sources.

16. The non-transitory computer-readable medium of claim 15, wherein the data sources are associated with metadata specifying information about an application programming interface (API) through which the data source can be accessed, the information about the API comprising at least one API call or a network address associated with the data source.

17. The non-transitory computer-readable medium of claim 16, wherein the program further causes the at least one computing device to transmit a request to retrieve the data set from the plurality of data sources instead of the query.

18. The non-transitory computer-readable medium of claim 16, wherein the data processing task comprises at least one query supported by the data sources, wherein the query is executed by the computing instance instead of by the data sources.

* * * * *